United States Patent [19]
Shigenaga

[11] Patent Number: 4,803,351
[45] Date of Patent: Feb. 7, 1989

[54] IC CARD SYSTEM WITH CONTROL OF DATA-WRITING PROCESS

[75] Inventor: Yoshimi Shigenaga, Higashiyamato, Japan

[73] Assignee: Casio Computer Co., Ltd., Tokyo, Japan

[21] Appl. No.: 21,341

[22] Filed: Mar. 3, 1987

[30] Foreign Application Priority Data

Mar. 12, 1986 [JP] Japan ............................... 61-54454

[51] Int. Cl.$^4$ .............................................. G06K 5/00
[52] U.S. Cl. ................................ 235/492; 235/380; 235/382.5; 340/825.34
[58] Field of Search ............... 235/492, 487, 380, 375, 235/379, 382.5; 340/825.34, 825.33; 380/24, 25

[56] References Cited
U.S. PATENT DOCUMENTS

| | | | |
|---|---|---|---|
| 4,425,490 | 1/1984 | Takeda et al. | 340/655 X |
| 4,650,975 | 3/1987 | Kitchener | 235/380 X |
| 4,710,613 | 12/1987 | Shigenaga | 235/380 |

FOREIGN PATENT DOCUMENTS

| | | |
|---|---|---|
| 2554293 | 5/1985 | France . |
| 2548803 | 11/1985 | France . |
| 2148075 | 5/1985 | United Kingdom . |

*Primary Examiner*—Philip H. Leung
*Attorney, Agent, or Firm*—Frishauf, Holtz, Goodman & Woodward

[57] ABSTRACT

An IC card system comprises an IC card terminal and an IC card which is inserted into the terminal, the terminal including a power-supply circuit for supplying data-writing power to a memory provided in the IC card, and a timer circuit for measuring a period of time corresponding to the maximum time during which one unit of data can be written into the memory. The supply of power to the IC card is renewed every time the IC card sends a request for an unit of data, within the period of time set in the time-measuring circuit. The supply of power is stopped when the IC card makes no request for an unit of data within the above-mentioned period of time.

7 Claims, 7 Drawing Sheets

IC CARD SYSTEM WITH CONTROL OF DATA-WRITING PROCESS

BACKGROUND OF THE INVENTION

The present invention relates to an IC card system wherein an IC card having a built-in IC circuit is used, and the data-writing power supplied to the memory provided within the IC circuit is controlled.

Recent times have come to be known as the "cashless era." Now, people can buy goods without paying in cash, by using cards issued by credit companies or the like.

Among the cards used at present are: plastic cards, embossed cards, and magnetic-stripe cards. These cards are so simple in structure that they can easily be forged. And fraudulent use of forged cards has become a major problem.

A new type of card, generally known as the "IC card", which is free of this drawback, has been invented. The IC card contains an IC circuit having a memory storing the personal identification number of the authenticated holder of the card. The personal identification number cannot be easily read from the IC card. An IC card system, which is a combination of the IC card and a terminal device, has also been invented.

Data can be exchanged between the IC card and the terminal, when the card is inserted in the terminal. In order to write data into the data memory (i.e., an EPROM) provided within the IC card, a data-writing voltage Vpp must be supplied from the terminal to the IC card. More specifically, the terminal supplies voltage Vpp to the IC card, in response to a request made by the card.

In the conventional IC card system, the terminal supplies data-writing voltage Vpp unconditionally, in response to the request from the IC card. The terminal continues to supply voltage Vpp to the IC card until the IC card gives the terminal an instruction for stopping the supply thereof.

Here arises a problem. Even if the IC card fails to function properly for some reason while the terminal is supplying voltage Vpp thereto, data-writing voltage Vpp will continue to be supplied to the card until the card gives the instruction for stopping the voltage supply. Hence, data other than that desired may be written in the EPROM, in some cases. In the event of data being erroneously written in the EPROM, not only can the IC card be no longer used, but, in addition, the data previously stored in the EPROM may be destroyed. When this happens, the card holder will be greatly inconvenienced. Therefore, the security of the conventional IC card system cannot be fully guaranteed.

SUMMARY OF THE INVENTION

It is accordingly the object of the present invention to provide an IC card system wherein the supply of a data-writing voltage is stopped immediately after it has been found that an IC card is failing to function correctly during the data-writing process, thereby to prevent the destruction of the data stored in the card, and also the inconvenience to the card holder which may result from such a functional failure of the IC card.

According to the present invention, there is provided an IC card system comprising IC card means, card terminal means, time-measuring means, detecting means, and control means. The IC card means contains at least one integrated circuit having a nonvolatile memory for storing data. The card terminal means is designed to exchange data with the IC card means when the IC card means is electrically coupled to it. The card terminal means includes power supply means for supplying data-writing power to the memory provided within the IC card means. The time-measuring means is used to measure a predetermined period of time for writing in one item of data. The detecting means detects whether or not the IC card means has responded to a data-transmission request. The control means controls the power supply means, in accordance with the output signal of the detecting means.

DETAILED DESCRIPTION OF THE PREFERRED EMBODIMENT

One embodiment of the present invention will now be described, with reference to the accompanying drawings.

Figure 1A:
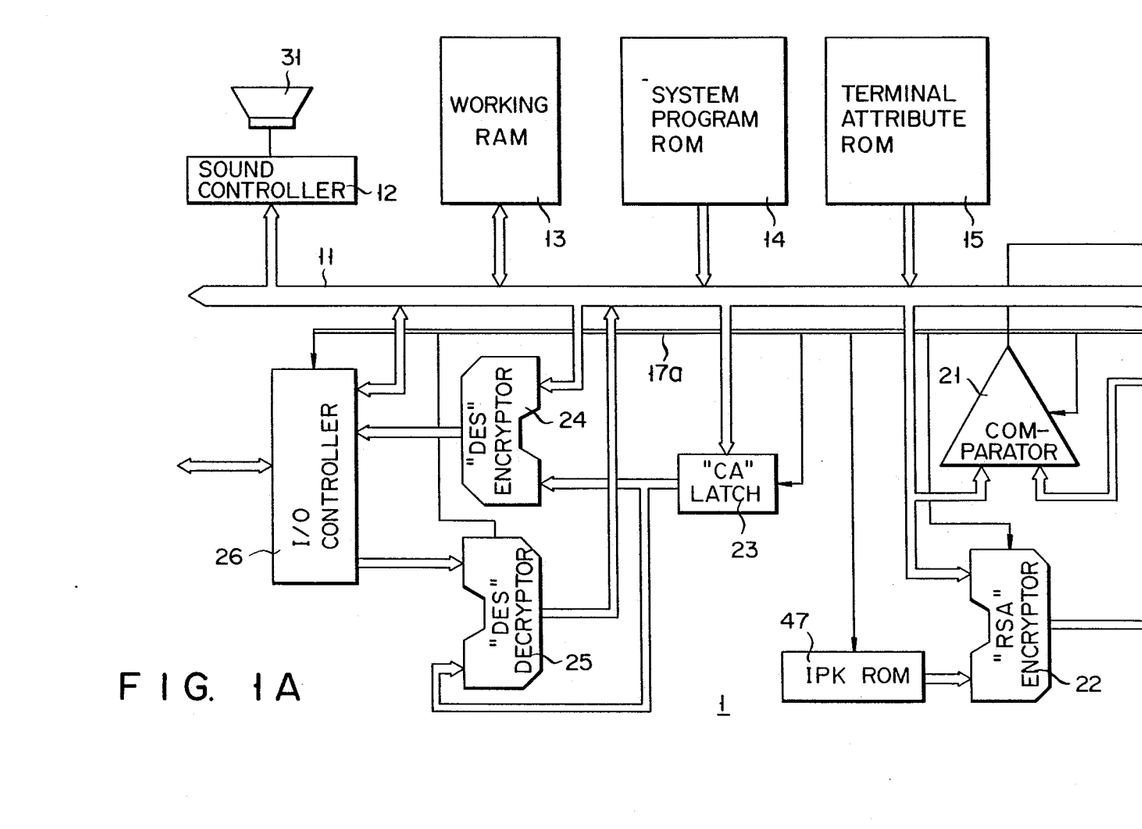
FIGS. 1A and 1B show, in combination, a block diagram of an IC card terminal according to one embodiment of the present invention.
Figure 1B:
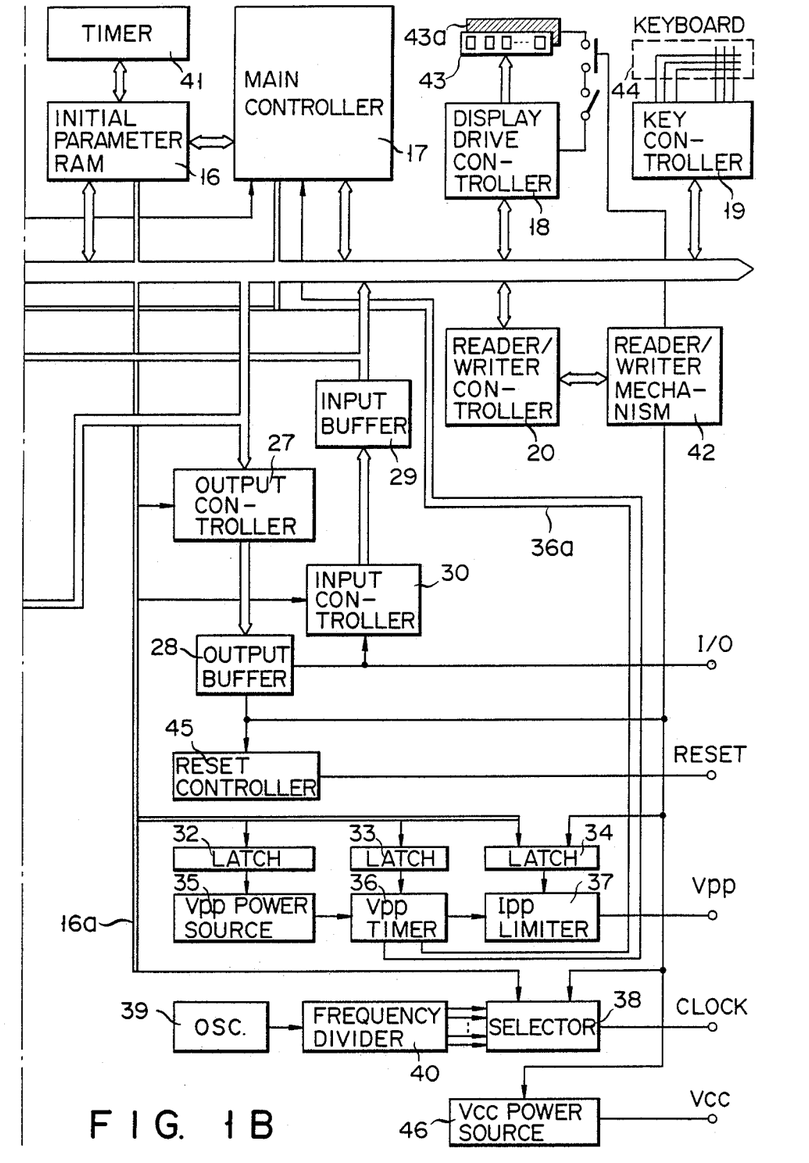

FIGS. 1A and db show a block diagram of an IC card terminal 1 provided in a system of this embodiment. As is illustrated in this figure, the terminal 1 comprises system bus 11. Sound controller 12, working RAM 13, system program ROM 14, terminal-attribute ROM 15, and initial-parameter RAM 16 are connected to system bus 11. Also connected to system bus 11 are main controller 17, display-drive controller 18, and key controller 19, in addition to reader/writer controller 20, comparator 21, RSA encryptor 22, CA latch 23, DES encryptor 24, and DES decryptor 25. I/O controller 26, output controller 27, and input buffer 29 are also connected to system bus 11. Output buffer 28 is coupled to output controller 27. Input controller 30 is connected to input buffer 29.

RSA encryptor 22 encrypts input data, in accordance with the RSA algorithm. CA latch 23 is used to latch a CA code. DES encryptor 24 encrypts input data, in accordance with the data-encryption standards. DES decryptor 25 decrypts DES codes.

Speaker 31 is coupled to sound controller 12, and generates an alarm when necessary.

Working RAM 13 has a memory area for storing various items of data, such as PAN, CHN, and EPD, transferred from the IC card (later described), and other items of data to be processed within IC card terminal 1.

System program ROM 14 stores various system programs. It also stores an ENQ code for permitting communication between terminal 1 and the IC card.

Terminal-attribute ROM 15 stores a terminal code TC specifying the use of IC card terminal 1. For instance, code TC including a manufacturer code, an issuer code, and a merchant code indicates that terminal 1 is used by the card manufacturer, issuer, or a merchant.

Initial-parameter RAM 16 is used to store the answer-to-reset data transferred from IC card 2. Output controller 27, input controller 30, Vpp level latch 32, Vpp time latch 33, and Ipp-level latch 34 are connected to initial-parameter RAM 16 by data-transmitting line 16a. Vpp power source 35 is coupled to Vpp level latch 32. Vpp timer 36 is connected to Vpp time latch 33. Ipp limiter 37 is connected to Ipp-level latch 34.

Vpp power source 35 provides voltage Vpp used to write data into the data memory contained in IC card 2.

Figure 2:
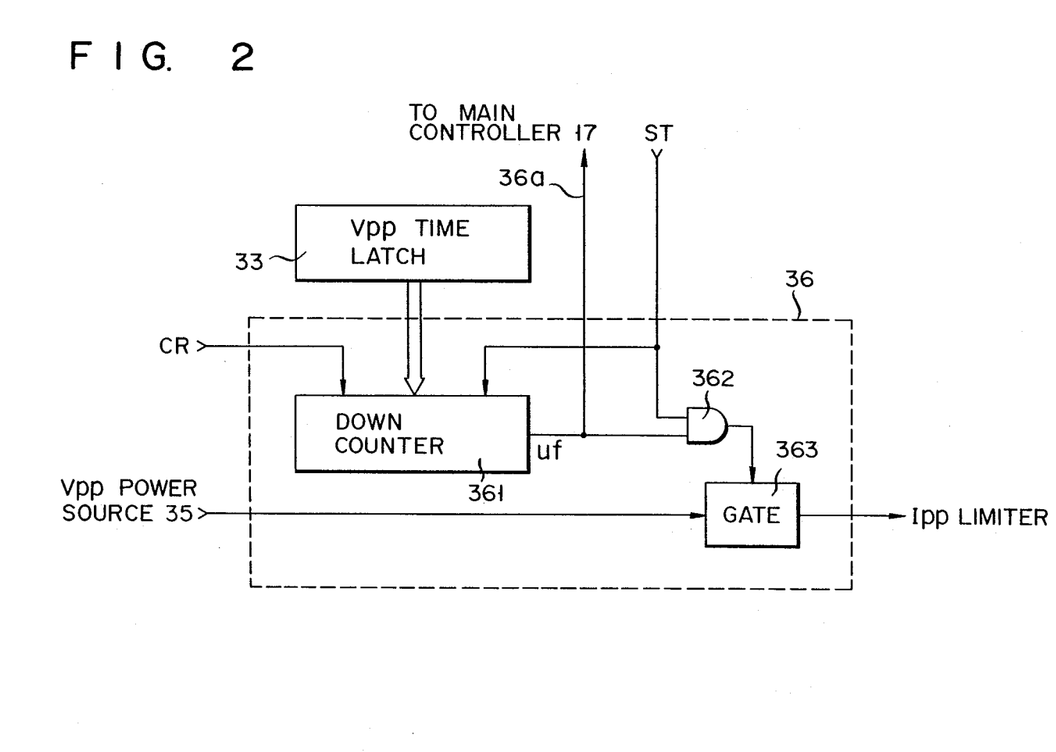
FIG. 2 is a circuit diagram of a Vpp timer used in the embodiment shown in FIGS. 1A and 1B.

Vpp timer 36 is used to determine the maximum time for applying voltage Vpp to IC card 2 in order to write one unit of data. This maximum time is designated by IC card 2, and any unit of data is processed within this maximum time. The structure of Vpp timer 36 is illustrated in FIG. 2. As is shown in FIG. 2, Vpp timer 36 comprises down-counter 361, AND gate 362, and gate 363. Value n determined by the Vpp-applying time latched in Vpp time latch 33 is set in counter 361. Value n defines the period of time sufficiently longer than the time required for writing one unit of data into the data memory of IC card 2, and is designated by the answer-to-reset data supplied from IC card 2. An ST (Start/-Stop) signal and a CR (Count/Restart) signal are supplied to down-counter 361 from main controller 17. When the ST signal is "0", voltage Vpp is not applied to IC card 2. When the ST signal is "1", voltage Vpp is applied to IC card 2, provided that the contents of down-counter 361 do not under-flow. When the CR signal is "0", down-counter 361 is preset to count n corresponding to the data stored in Vpp time latch 33. When the CR signal is "1", down-counter 361 performs a count-down operation. The underflow uf of counter 361 is supplied to main controller 17 via control line 36a.

Ipp limiter 37 determines the maximum value of the current for writing data into the data memory of IC card 2.

The maximum data-writing voltage applied from Vpp power source 35, the maximum time for applying Vpp voltage, which is measured by Vpp timer 36, and the maximum data-writing current, which is determined by Ipp limiter 37, are set in accordance with the answer-to-reset data stored in initial-parameter RAM 16.

Selector 38 for selecting an operation frequency for IC card 2 is connected to data-transmitting line 16a. The output signal of oscillator 39 is supplied to frequency divider 40. Frequency divider 40 divides the frequency of the output signal from oscillator 39, thereby outputting signals of different frequencies. Selector 38 selects one of the output signals of frequency divider 40, and outputs it from a terminal Clock.

Timer 41 is coupled to initial-parameter RAM 16, and measures the maximum response-waiting time from the time an ENQ signal or any other command signal is transmitted to IC card 2, in accordance with the answer-to-reset data stored in initial-parameter RAM 16. When no response signals are transmitted from IC card 2 to terminal 1 within this maximum response-waiting time, main controller 17 either instructs a re-transmission of a command signal to IC card 2, or causes reader/writer controller 20 to disconnect IC card 2 from terminal 1.

Comparator 21, RSA encryptor 22, CA latch 23, and I/O controller 26 are coupled to main controller 17 by means of system control line 17a. In accordance with the operation condition of the IC card system, main controller 17 supplies control signals to these components.

Display-drive controller 18 is used to control display 43 and back light 43a. Back light 43a is provided at the back of display 43, and comprises EL elements. It emits light only when IC card 2 is electrically coupled to terminal 1 by reader/writer mechanism 42.

Key controller 19 supplies key-sampling signals to the keyboard of IC card terminal 1, thereby to detect any key operation of the keyboard.

Reader/writer controller 20 controls reader/writer mechanism 42. Mechanism 42 has a motor for moving IC card 2 from the card inlet port of terminal 1 to a predetermined position therewithin, and for electrically coupling IC card 2 to terminal 1. When the required operations relating to IC card 2 are completed, mechanism 42 moves card 2 from the aforementioned position, back to the card inlet port.

Output buffer 28, reset controller 45, Ipp-level latch 34, selector 38, and Vcc power source 46 are connected to reader/writer mechanism 42. An I/O terminal is coupled to output buffer 28. A reset terminal is connected to reset controller 45. The clock signal is coupled to selector 38. A Vcc terminal is connected to Vcc power source 46.

Input controller 30 and output controller 27 control the exchange of data between terminal 1 and card 2, in accordance with the instruction supplied from main controller 17 via initial-parameter RAM 16. Input controller 30 receives the data transferred from IC card 2, and supplies this data to working RAM 13 and comparator 21 via input buffer 29. The output of comparator 21 is supplied to main controller 17. Output controller 27 receives the data supplied from terminal-attribute ROM 15 and also the encrypted data supplied from RSA encryptor 22, and supplies these items of data to IC card 2 via output buffer 28.

RSA encryptor 22 is designed to encrypt data PAN, supplied from working RAM 13 via system bus 11, by using the public key code read from IPK (Issuer's Public Key) ROM 47. IPK ROM 47 stores the public key code associated with the decryption code PRK stored in the data memory of IC card 2. ROM 47 outputs the public key code upon receipt of an instruction from main controller 17.

CA latch 23 outputs a CA code to DES encryptor 24 and also to DES decryptor 25. Prescribed data is input to DES encryptor 24 via system bus 11. More specifically, the data PAN stored in working RAM 13 is input to DES encryptor 24. Encryptor 24 encrypts PAN by using CA as a key code, and outputs the encrypted PAN to I/O controller 26. DES decryptor 25 decrypts the encrypted data input to I/O controller 26, by using CA as a key code, and outputs the decrypted data to system bus 11.

I/O controller 26 is used to exchange encrypted data between IC card terminal 1 and a data base, i.e., a host computer, which is connected to terminal 1 in an on-line fashion.

The electric circuit provided in IC card 2 will now be described, with reference to FIG. 3.

Figure 3:
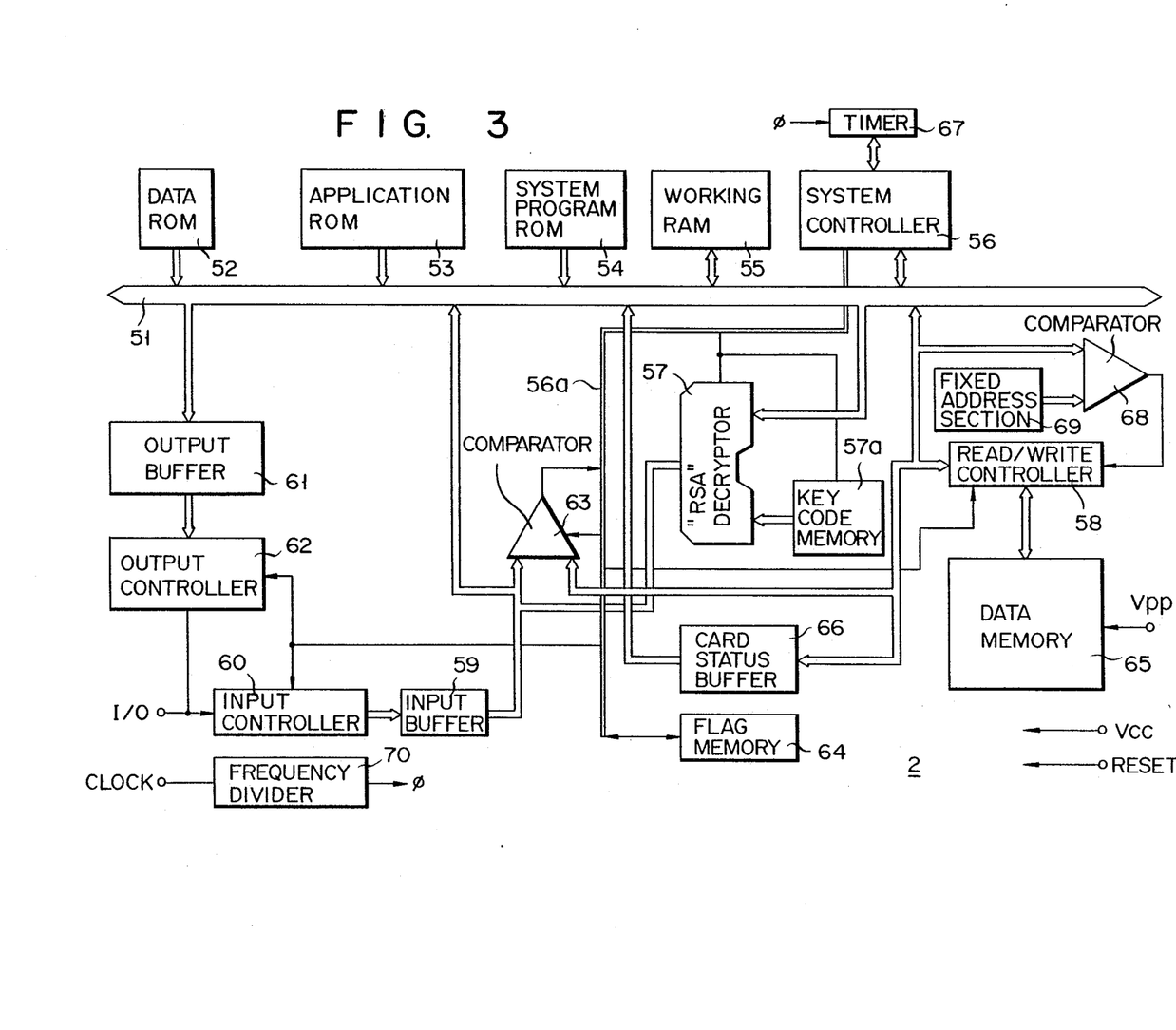
FIG. 3 is a block diagram showing an IC card designed for use in combination with the terminal shown in FIG. 1.

As is shown in FIG. 3, the circuit comprises system bus 51. Data ROM 52, application ROM 53, system program ROM 54, working RAM 55, and system controller 56 are connected to system bus 51. Also connected to system bus 51 are RSA decryptor 57, read/write controller 58, input buffer 59, and output buffer 61. Input controller 60 is coupled to input buffer 59. Output controller 62 is coupled to output buffer 61. A data input/output terminal I/O is connected to input controller 60 and also to output controller 62.

Data ROM 52 stores data representing various conditions for operating IC card 2, such as the datawriting voltage, maximum data-writing current, maximum time for applying the data-writing voltage, maximum amount of data to transmit, and maximum response-waiting time. This data showing these conditions is transferred in a prescribed format, as the answer-to-reset data, to IC card terminal 1, upon completion of the initialization of IC card 2.

Application ROM 53 stores data APN (Application Name) specifying the use of IC card 2. Data APN is transferred in a prescribed format to terminal 1, in order to achieve the exchange of attributes between terminal 1 and card 2, after the initial parameters have been set in initial parameter RAM 16 of terminal 1, in accordance with the answer-to-reset data.

System program ROM 54 stores an ACK code and a NAC code, as well as various system programs. The ACK code shows that the signal transmitted from terminal 1 is a correct one. The NAC code indicates that the signal transmitted from terminal 1 is incorrect.

System controller 56 contains a decision means which generates instructions in accordance with the signals supplied from input buffer 59 and representing the receipt of input data to IC card 2, and also in accordance with the operation conditions of the other components of IC card 2. These instructions are supplied from system controller 56 to the other components of the IC card.

RSA decryptor 57 decrypts the data input to it, by using the RSA algorithm. More precisely, decryptor 57 receives the data transmitted from terminal 1 via input buffer 59, decrypts this data by using the decryption key code stored in key code memory 57a, namely, the issure's private key, and outputs the decrypted data to comparator 63. The output of comparator 63 is supplied to system control line 56a connected to system controller 56. Flag memory 64 is coupled to system control line 56a, and operates in accordance with the output from comparator 63.

Read/write controller 58 is designed to control the writing of data to, and the reading of data from, data memory 65, in accordance with the instruction sent from system controller 56. The data read from data memory 65, under the control of read/write controller 58, is output to comparator 63, system bus 51, or card-status buffer 66.

Data memory 65 is, for example, an EPROM (Erasable Programmable Read-Only Memory). It has a memory area for storing various codes CA, IPIN, PAN, CHN, EPD, PRK, and RTN, and also status data ST. Code CHN represents the card holder's name. Code EPD indicates the expiration date of IC card 2. Code RTN shows the number of times erroneous data has been input to card 2. Status data ST represents the present status of IC card 2. More specifically, data ST shows that IC card 2 has just been manufactured, i.e., that no PIN has been registered in IC card 2. Card status data ST is transmitted to terminal 1, in the same format as data APN (card application name). Data memory 65 is not limited to an EPROM. For example, it can be an EEPROM (Electrically Erasable Programmable ROM).

Timer 67 is connected to system controller 56, and measures a specified period of time which has elapsed from the time a command for the supply of the datawriting voltage was sent to card terminal 1. When a NAK code is not supplied from terminal 1 while timer 67 is measuring this time period, system controller 56 prohibits both the writing of data into IC card 2 and the reading of data therefrom.

A bus line connects read/write controller 58 and system bus 51. Address comparator 68 is coupled to this bus line. Comparator 68 compares the unused address stored in fixed-address section 69, at the completion of a test conducted on the IC card immediately after the card has been manufactured, with the address specified by an address signal supplied via system bus 51. The output of address comparator 68 is supplied to read/write controller 58. When terminal 1 is fraudulently used, and the output of comparator 68 thus indicates that the compared addresses are different, read/write controller 58 erases all data stored in data memory 65. The secret data is thereby destroyed, and can never be known to anyone other than the card holder.

When IC card 2 is electrically connected to terminal 1, a reset signal Reset is supplied from terminal 1 to IC card 2, via a connector (not shown). Simultaneously, a system clock signal Clock is also supplied from terminal 1 to card 2. Further, the Vcc power source and the Vpp power source are coupled to IC card 2. The Vpp power source is used to supply the data-writing power to data memory 65. The voltage of this power is determined in terminal 1 by the answer-to-reset data stored in data ROM 52, and is transferred from IC card 2 to terminal 1. The signal Clock, i.e., the system clock signal, is supplied to frequency divider 70, the output signal of which is supplied to the various circuit components of IC card 2.

The answer-to-reset data is described in detail in U.S. patent application Ser. No. 884,280 filed by the same assignee hereof, on July 10, 1986. Hence, this data is not defined herein.

The operation of the embodiment described above will now be explained.

When IC card 2 is electrically coupled to IC card terminal 1, an initializing signal is supplied to IC card 2 from main controller 17 of terminal 1, whereby input-/output terminal I/O, reset terminal Reset, the Vcc terminal, the Vpp terminal, and clock terminal Clock are set in prescribed states. IC card 2 can now operate in response to the various signals and data supplied from these terminals.

Figure 4A:
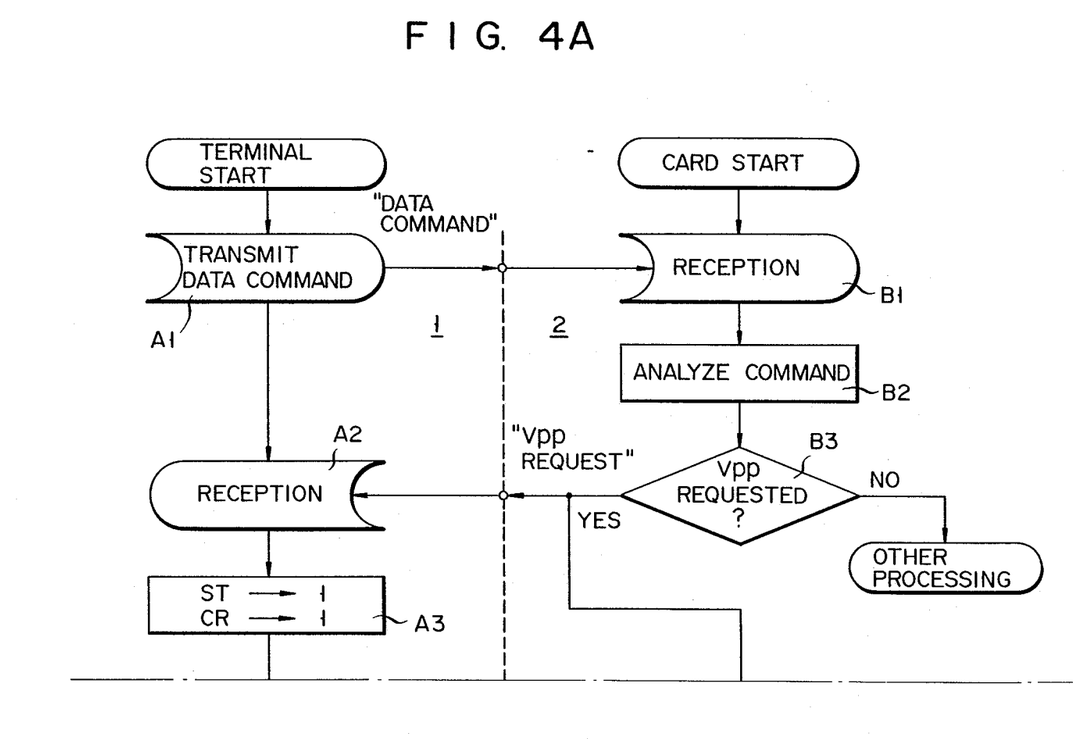
FIGS. 4A and 4B show, in combination, a flow chart explaining the operation of the embodiment shown in FIGS. 1A, 1 and 3.
Figure 4B:
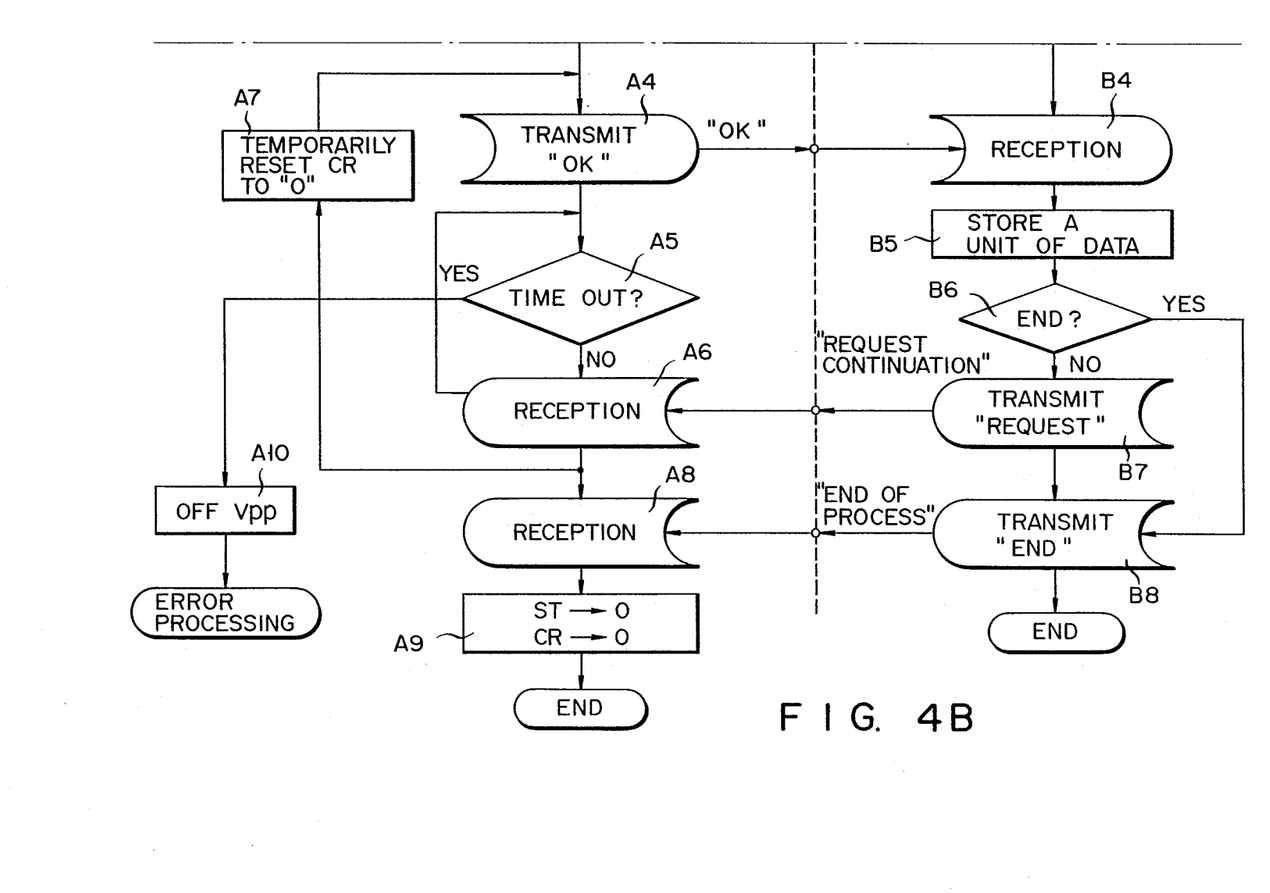

Thereafter, the answer-to-reset data is transferred from IC card 2 to input/output terminal I/O of terminal 1. This data is supplied to input controller 30, is temporarily stored in input buffer 29, and written into initial parameter RAM 16 via system bus 11. It is then determined whether the answer-to-reset data can or cannot be processed by terminal 1. When this answer is "yes", the data is used to set the maximum amount of data to be transferred, which will be controlled by main controller 17, the data-writing voltage to be provided by Vpp power source 35, the Vpp-supplying time which will be defined by Vpp timer 36, the maximum data-writing current which will be determined by Ipp limiter 37, and the operation frequency which will be selected by selector 38. Then, attribute exchange is performed between terminal 1 and IC card 2, to ascertain whether or not data can readily be exchanged between terminal 1 and IC card 2. When it is ascertained that data can be exchanged without trouble, between terminal 1 and card 2, the sequence of operations illustrated in the flow chart of FIGS. 4A and 4B are performed.

First, in step A1, a data command is sent from terminal 1 to card 2. IC card 2 receives this command in step B1. The operation in card 2 goes to step B2, in which system controller 56 analyzes the data command. In the next step, B3, it is determined whether or not data-writing voltage Vpp has been requested. If NO in step B3, a specified data-processing step is performed. If YES in step B3, a request for Voltage Vpp is sent to terminal 1.

Terminal 1 receives this request in step A2. Then, in the next step, A3, main controller 17 sets the ST and CR signals to "1". In step A4, an "OK" signal is supplied to IC card 2. From this time on, voltage Vpp is supplied to card 2.

IC card 2 receives the "OK" signal from terminal 1, in step B4. In the next step, B5, a unit of data is written into data memory 65. The amount of data in the unit does not exceed the length of a predetermined block of data that can be processed within a prescribed period of time. In step B6, it is determined whether or not the data unit has been written in. If NO, the operation advances to step B7. In step B7, a request for more data is supplied to terminal 1.

Meanwhile, in terminal 1, Vpp timer 36 is started when the "OK" signal is output. Down-counter 361 of Vpp timer 36 is set to value n stored in Vpp time latch 33 (n=10) when the CR signal falls to level "0". When the CR signal rises to level "1", counter 361 starts counting down value n. At this time, the CR signal at level "1" and the output of counter 361 is input to AND gate 362, whereby data-writing voltage Vpp is supplied to IC card 2 through gate 363.

In step A5, it is determined whether or not counter 361 has reached the zero-count. The answer to the question posed in step A5 is NO. This is because count n set to counter 361 corresponds to a period far longer than that requested for one unit of data to be written into data memory 65, and no underflow of data takes place. In the next step, A6, terminal 1 waits for the request for more data to be supplied to IC card 2. Until terminal 1 receives this request, step A5 is repeated. When terminal 1 receives the request, in step A6, the operation goes to step A7. In step A7, the CR signal is temporarily lowered to level "0". As a result, down-counter 361 is set to the count n stored in Vpp time latch 33, whereby the Vpp-supplying time is renewed. The operation then returns to step A4.

Thereafter, steps A4 to A6 are repeated in terminal 1, and steps B4 to B7 are repeated in IC card 2, until all the data required by card 2 is written into data memory 65, that is, until the answer YES is obtained, in step B6.

When YES in step B6, the operation in IC card 2 goes to step B8. An END signal, indicating that all the necessary data has been written into data memory 65, is supplied to terminal 1. When terminal 1 receives the END signal, in step A8, the operation in terminal 1 advances to step A9. In step A9, both the ST signal and the CR signal are lowered to level "0", thereby stopping the supply of Vpp voltage to IC card 2.

Assume that IC card 2 has failed to function correctly, and the request for more data is not transferred from card 2 to terminal 1. In this case, down-counter 361 encounters an underflow of data, in step A5. Hence, counter 361 reaches the zero-count, and the answer YES is obtained in step A5. The operation in terminal 1 goes to step A10. In step A10, Vpp power source 35 is turned off by main controller 17, due to the underflow signal uf supplied from counter 361, irrespective of the level of the ST signal, i.e., level "0" or level "1". In this way, error-processing is performed.

Figure 5A:
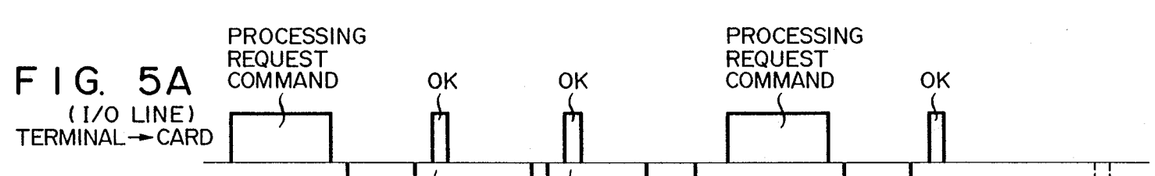
FIGS. 5A to 5F form a timing chart also explaining the operation of the embodiment shown in FIGS. 1A, 1B and 3.
Figures 5B, 5C:
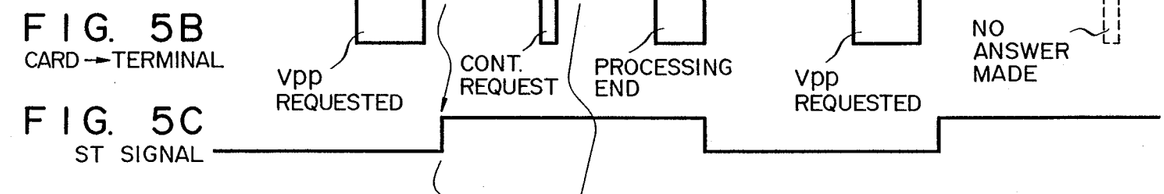
Figures 5D, 5E, 5F:
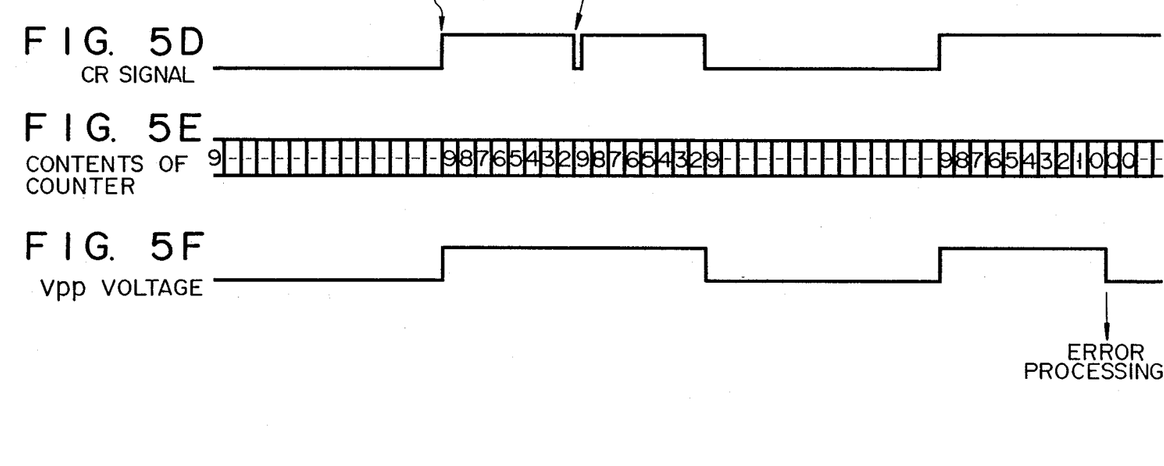

The above-mentioned sequence of operations will be further explained with reference to the timing chart formed by FIGS. 5A to 5F. FIG. 5A shows when the processing-request command and the "OK" signal are generated. FIG. 5B indicates when the Vpp request, the request for more data, and processing-end signal are generated. FIG. 5C shows when the ST signal is produced. FIG. 5D illustrates when the CR signal is generated. FIG. 5E shows how the count of down-counter 361 changes with time. FIG. 5F shows when the supply of voltage Vpp is started and stopped.

Let us assume that a Vpp request has been sent from IC card 2 to terminal 1, that both the ST and the CR signals have therefore risen to level "1", and that an "OK" signal is simultaneously supplied from terminal 1 to IC card 2. When the "OK" signal is supplied to IC card 2, count n (=10) of down-counter 361 decrements to 9, 8, 7, and so on. At the same time, the supply of voltage Vpp to card 2 is started. A request for more data is sent from IC card 2 before down-counter 361 encounters an underflow of data. When terminal 1 receives this request, the CR signal temporarily falls to level "0". As a result, counter 361 is preset to count n (=10). Hence, data-writing voltage Vpp is continuously supplied to IC card 2. When a processing-end signal is supplied from card 2 to terminal 1, the supply of voltage Vpp to card 2 is stopped.

When IC card 2 fails to function correctly while the count of counter 361 decreasing and while voltage Vpp is being supplied to card 2, a request for more data cannot be output from IC card 2. In this case, the count of counter 361 is reduced to zero, and counter 361 enters an under-flow condition. Consequently, the supply of voltage Vpp is stopped, no matter which level the ST and CR signals are at.

As has been described, unless a request for more data is sent from IC card 2 to terminal 1, data-writing voltage Vpp will continue to be supplied to card 2 for the longest time required for writing one unit of data into data memory 65, this period having been specified by a code permanently stored in IC card 2. When a request for more data is made before the specified period elapses, the counter for measuring this period is immediately reset, whereby the supply of voltage Vpp continues. When there is no request for more data before the specified period expires, due to a failure or malfunction of IC card 2, the supply of voltage Vpp is stopped, unlike in the conventional IC card system. No data other than that desired can ever be written into data memory 65. Inconvenience to the card holder, which may result from the failure or malfunctioning of IC card 2, can thus readily be prevented.

Moreover, as soon as the supply of voltage Vpp is stopped in the manner as described above, main controller 17 stops controlling the malfunctioning IC card 2. This helps to enhance the operational efficiency of main controller 17.

The present invention is not limited to the above embodiment. Various changes or modifications can be made without departing from the spirit and scope of the invention. For example, down-counter 361, which is provided in Vpp timer 36, can be replaced by an up-counter.

In the IC card system according to the present invention, the supply of data-writing voltage from the IC card terminal to the IC card can be stopped at once, when the IC card fails to function or functions erroneously. Hence, the system can the card holder from being inconvenienced, which would otherwise result from the failure or malfunctioning of the IC card. The IC card system of the present invention can therefore ensure the security of the IC card.

What is claimed is:

1. An IC card system comprising:
   IC card means including at least one integrated circuit having a nonvolatile memory for storing data; and
   card terminal means for writing data into said IC card means when said IC card means is electrically coupled to it;
   said card terminal means including:
   time-measuring means for measuring a predetermined period of time;
   power-supply means for supplying data-writing power to said nonvolatile memory provided within said IC card means while said time-measuring means is measuring said predetermined period of time;
   detecting means for detecting a response from said IC card means; and
   control means coupled to said power supply means and including means for initializing said time-measuring means when said detecting means detects said response from said IC card means, in order to supply said data-writing power from said power-supply means to said nonvolatile memory, and further including means for turning off said power-supply means when said time-measuring means finishes measuring said predetermined period of time, as a result of no response from said IC card means to said detecting means.

2. The IC card system according to claim 1, wherein said predetermined period of time is slightly longer than the maximum time during which one unit of data transferred from said card terminal means to said IC card means can be continuously written into said nonvolatile memory.

3. The IC card system according to claim 2, wherein said nonvolatile memory provided within said IC card means comprises an erasable programmable ROM.

4. The IC card system according to claim 1, wherein said IC card means further includes means for decrypting data transferred from said card terminal means, and means for transmitting, to said card terminal means, a power-supply start signal, when the data decrypted by said decryption means signifies a command for data-writing.

5. The IC card system according to claim 4, wherein said IC card means further includes:
   means for judging whether or not all units of data have been written into said nonvolatile memory; and
   means for transmitting to said card terminal means a power-supply continuation signal when said judging means judges that all units of data have not been written into said nonvolatile memory; and
   said time-measuring means being initialized by said power-supply continuation signal.

6. The IC card system according to claim 5, wherein:
   said IC card means further includes means for said card terminal means with a finishing signal indicating that all units of data transferred from said card terminal means have been written into said nonvolatile memory; and
   said power-supply means provided in said card terminal means includes means for stopping supplying of power to said nonvolatile memory, in response to said finishing signal, under the control of said control means.

7. The IC card system according to claim 1, wherein said time-measuring means includes a down-counter.

* * * * *